United States Patent Office 2,921,071
Patented Jan. 12, 1960

2,921,071

HALOGENO-PYRIDAZINES AND THEIR MANUFACTURE

Jean Druey, Riehen, and Paul Schmidt, Therwil, Switzerland, assignors to Ciba Pharmaceutical Products, Inc., Summit, N.J.

No Drawing. Application May 4, 1955
Serial No. 506,059

Claims priority, application Switzerland May 11, 1954

9 Claims. (Cl. 260—250)

This invention relates to 6-halogeno-, especially 6-chloro-pyridazines which contain in the 5-position a free or functionally converted carboxyl group or an acyl radical. Examples of halogen are chlorine, bromine and iodine, and a functionally converted carboxyl group is, for example, an esterified or amidated carboxyl group and especially the cyano group. Among acyl radicals there are to be mentioned lower alkanoyls, e.g., propionyl, butanoyl, and more especially the acetyl group. The invention relates especially to those 6-halogen-pyridazines of the aforesaid type, which contain in the 3- and 4-positions lower alkyl radicals, for example, methyl, ethyl, propyl, butyl and the like radicals, e.g. 6-chloro-5-cyano-3,4-dimethyl-pyridazine of the formula

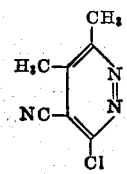

However, they may contain other radicals in these positions, such as phenyl radicals.

The new compounds possess a fungicidal action, for example against Epidermophyton and Microsporum and an amoebicidal action, for example against *Entamoeba histolytica*, and can be used as medicaments for combating such fungi or amoebae. They are also valuable as intermediate products, as for example, for the manufacture of the corresponding 6-alkoxy or 6-alkylmercapto compounds which are disclosed and claimed in our copending application Serial No. 506,060, filed on May 4, 1955, now Patent No. 2,833,766. The preparation of the aforesaid 6-alkoxy and 6-alkylmercapto compounds can, for example, be carried out by treating the above described 6-halogeno-pyridazines with alkanols, preferably in the presence of an alkaline condensing agent, or by treatment with thiourea, so as to produce the corresponding mercapto compounds which, in turn, can be alkylated by treatment with reactive esters of alkanols, for example, dialkyl sulfate or alkyl halides, preferably in the presence of an alkaline condensing agent.

In general, the new halogeno-pyridazines can be made by treating a 6-hydroxy-pyridazine, which contains in the 5-position a free or functionally converted carboxyl group or an acyl radical, with a halogenating agent. As halogenating agents there are suitable more especially halides of phosphoric acid, such as phosphorus oxychloride, phosphorus pentachloride or phosphorus pentabromide. The reaction may be carried out in the presence or absence of a diluent or catalyst in an open vessel or a closed vessel under pressure.

The 6-hydroxy-pyridazines employed as starting materials can in general be prepared by condensing hydrazine with two components, namely (a) an organic α-dicarbonyl-compound or a reactive functional carbonyl derivative thereof and (b) an organic carboxylic acid of which the carbon grouping the α-position is a reactive methylene group or a reactive functional derivative of such acid, in optional sequence, i.e., directly or in stages, ring-closure being effected by using a basic condensing agent.

The new compounds may be used as medicaments, for example, in the form of pharmaceutical preparations, which contain the active substance in admixture with an adjuvant facilitating the administration thereof, for example, a pharmaceutical organic or inorganic carrier suitable for enteral, parenteral or topical administration. As carriers there are used substances which do not react with the new compounds, for example gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example, in the form of tablets, dragees, salves, creams or in liquid forms as solutions, suspensions or emulsions. If desired, they may be sterilized and/or may contain auxiliary substances, such as preserving, stabilizing, wetting or emulsifying agents, or salts for controlling the osmotic pressure or buffers. They may also contain other therapeutically valuable substances. The preparations are made by the usual methods employed in pharmaceutical formulation.

The following examples illustrate the invention, the parts being by weight unless otherwise stated, and the relationship of parts by weight to parts by volume being the same as that of the gram to the cubic centimeter:

Example 1

20 parts of 6-hydroxy-5-cyano-3,4-dimethyl-pyridazine are heated for one hour in a bath at 100° C. together with 90 parts by volume of phosphorus oxychloride. The excess of phosphorus oxychloride is evaporated in vacuo and the residue is mixed with ice water. The aqueous solution is adjusted to a pH value of 7 with a 2 N-solution of caustic soda, then extracted with chloroform, and the residue from the chloroform solution is recrystallized from ligroin. 6-chloro-5-cyano-3,4-dimethyl-pyridazine is obtained in the form of white crystals melting at 81–82° C. The yield is 90%.

The 6-hydroxy-5-cyano-3,4-dimethyl-pyridazine used as starting material can be prepared as follows:

40 parts of hydrazine hydrate are introduced dropwise into a solution of 90 parts of methyl cyanacetate in 450 parts by volume of ethyl alcohol while cooling with ice water. The whole is allowed to stand for one hour at room temperature and then filtered with suction to separate the cyanacetic acid hydrazide which precipitates in the form of white crystals melting at 115° C.

22 parts of diacetyl are dissolved in 150 parts by volume of ethyl alcohol and slowly mixed with 24 parts of cyanacetic acid hydrazide, whereupon the solution heats up slightly and a white crystalline precipitate is soon formed. After 2 hours, the resulting diacetyl monocyanacetyl hydrazone is separated by filtering with suction. The product melts at 133–134° C. after recrystallization from benzene.

2.5 parts of diacetylmono-cyanacetyl-hydrazone are introduced into a solution of 0.7 part of sodium in 50 parts by volume of ethyl alcohol, and the whole is heated for 3 hours at a bath temperature of 90° C. The mixture is filtered with suction while hot to remove impurities, the filtrate is evaporated, the residue is taken up in a small amount of water, and adjusted to a pH value of 5–6 with 2 N-hydrochloric acid. The 6-hydroxy-5-cyano-3,4-dimethyl-pyridazine precipitates out, and is again recrystallized from ethyl alcohol. There are obtained white crystals melting at 211–212° C.

Example 2

5 parts of 6-hydroxy-5-carbethoxy-3,4-diphenyl-pyridazine and 30 parts by volume of phosphorus oxychloride are heated for ½ hour at 100° C. The excess of phosphorus oxychloride is then evaporated in vacuo, the residue is taken up in ice water, and the aqueous solution is extracted with ether. The ethereal residue is crystallized from ethyl alcohol, and there is obtained 6-chloro-5-carbethoxy-3,4-diphenyl-pyridazine of the formula

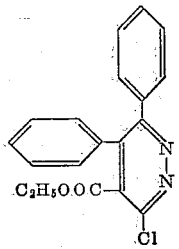

in the form of white crystals melting at 114° C. The yield is 85%.

The 6-hydroxy-5-carbethoxy-3,4-diphenyl-pyridazine used as starting material can be prepared as follows:

10 parts of benzil are introduced into 50 parts by volume of ethyl alcohol and mixed, while cooling with ice water, with 3 parts of hydrazine hydrate. In order to complete the reaction the mixture is heated for a further ½ hour at 60° C., then allowed to cool and filtered with suction to remove the precipitate. In this manner there is obtained the monohydrazone of benzil in the form of white crystals melting at 151° C.

10 parts of benzil monohydrazone and 10 parts of malonic acid diethyl ester are introduced into a sodium ethylate solution prepared from 2 parts of sodium and 200 parts by volume of ethyl alcohol, and the mixture is heated for 3 hours in a bath having a temperature of 90° C. The mixture is allowed to cool, a small amount of impurities is filtered off with suction, and the alcohol is evaporated under reduced pressure. The residue is dissolved in a small quantity of water, the solution is adjusted to a pH value of 5–6 by means of 2 N-hydrochloric acid, and the white precipitate is filtered off. After recrystallization from boiling benzene there is obtained 6-hydroxy-5-carbethoxy-3,4-diphenyl-pyridazine in the form of white crystals melting at 219–220° C.

Example 3

20 parts of 6-hydroxy-5-cyano-3,4-diphenyl-pyridazine are heated with 120 parts by volume of phosphorus oxychloride for ½ hour at 100° C. The excess of phosphorus oxychloride is then evaporated in vacuo, and the residue is decomposed with ice water. The aqueous solution is extracted by agitation with ether, the ether is evaporated and the ethereal residue is recrystallized from ethyl alcohol. There is obtained 6-chloro-5-cyano-3,4-diphenyl-pyridazine of the formula

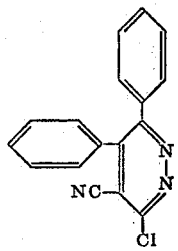

in the form of white crystals melting at 134–135° C. The yield is 75%.

The 6-hydroxy-5-cyano-3,4-diphenyl-pyridazine used as starting material can be prepared as follows:

1.25 parts of sodium are introduced into 200 parts by volume of ethyl alcohol. When all the sodium has reacted, 11.5 parts of benzil monohydrazone and 7 parts of ethyl cyanacetate are added, the whole is heated for 3 hours at a bath temperature of 90° C., then allowed to cool and filtered with suction in order to remove impurities which have separated out. The filtrate is evaporated to dryness in vacuo, the residue is taken up in a small amount of water and the solution is adjusted to a pH value of 5–6. The precipitate which separates out is recrystallized from ethyl alcohol. There is obtained 6-hydroxy-5-cyano-3,4-diphenyl-pyridazine in the form of white crystals melting at 274–275° C.

Example 4

17.2 parts of 6-hydroxy-5-carbethoxy-3,4-di-(para-chlorophenyl)-pyridazine and 100 parts by volume of phosphorus oxychloride are heated for ½ hour at 100° C. The excess of phosphorus oxychloride is then evaporated in vacuo, the residue is decomposed with ice water, and extracted with ether. By recrystallization of the ether residue from ethyl alcohol there is obtained 6-chloro-5-carbethoxy-3,4-di-(para-chlorophenyl)-pyridazine of the formula

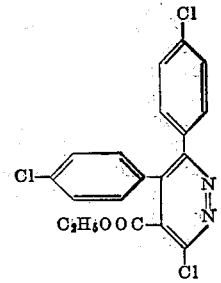

in the form of white crystals melting at 137–139° C. The yield is 45%.

The 6-hydroxy-5-carbethoxy-3,4-di(para-chlorophenyl)-pyridazine can be prepared as follows:

2.3 parts of sodium, dissolved in 400 parts by volume of absolute ethyl alcohol, are heated with 20 parts of ethyl malonate and 29.3 parts of para:para'-dichlorobenzyl monohydrazone for 4 hours at 90° C. while stirring. The mixture is evaporated to dryness, and the residue is dissolved in 800 parts by volume of a 1 N-solution of caustic soda. The solution is given a pH value of 6–7 with 2 N-hydrochloric acid, and the precipitate is filtered off with suction. By recrystallization from boiling ethyl alcohol there is obtained 6-hydroxy-5-carbethoxy-3,4-di-(para-chlorophenyl)-pyridazine in the form of white crystals melting at 235–236° C.

Example 5

5 parts of 6-hydroxy-5-acetyl-3,4-diphenyl-pyridazine and 30 parts by volume of phosphorus oxychloride are heated for ½ hour at 100° C. The excess of phosphorus oxychloride is then evaporated in vacuo, the residue is decomposed with ice water, and extracted with chloroform. After distilling off the chloroform, the resulting 6-chloro-5-acetyl-3,4-diphenyl-pyridazine of the formula

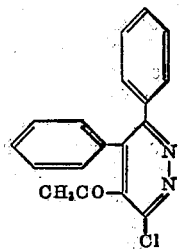

is recrystallized from ethyl alcohol in the form of white crystals melting at 166–167° C. The yield is 82%.

The 6-hydroxy-5-acetyl-3,4-diphenyl-pyridazine can be prepared as follows:

23 parts of benzil monohydrazone and 16 parts of ethyl acetoacetate are added to a solution of 2.5 parts of sodium in 150 parts by volume of ethyl alcohol. The mixture is heated for 3 hours in a bath having a temperature of 90° C. then it is allowed to cool, filtered with suction to remove a small amount of impurities, and the filtrate is evaporated to dryness in vacuo. The residue is taken up in a small quantity of water, the solution is given a pH value of 5–6 by means of 2 N-hydrochloric acid, whereupon a yellow product precipitates which is recrystallized from boiling ethyl alcohol. In this manner there is obtained 6-hydroxy-5-acetyl-3,4-diphenyl-pyridazine in the form of pale yellowish crystals melting at 232–233° C.

What is claimed is:
1. 6-chloro-5-cyano-3,4-dimethyl-pyridazine.
2. 6-chloro-5-cyano-3,4-diphenyl-pyridazine.
3. 6-chloro-5-acetyl-3,4-diphenyl-pyridazine.
4. Pyridazines of the general formula:

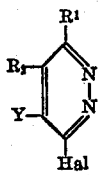

wherein $R_1$ and $R_2$ each represents a member of the group consisting of hydrogen, lower alkyl radicals and phenyl radicals, Y stands for a member of the group consisting of the cyano group and lower alkanoyl radicals, and Hal represents a halogen atom having an atomic weight of more than 20.

5. 6-Hal-5-cyano-3-$R_1$-4-$R_2$-pyridazines wherein $R_1$ and $R_2$ each represents a member of the group consisting of hydrogen, lower alkyl radicals and phenyl radicals, and Hal stands for a halogen atom having an atomic weight of more than 20.

6. 6-chloro-5-cyano-3-$R_1$-4-$R_2$-pyridazines wherein $R_1$ and $R_2$ each represents a member of the group consisting of hydrogen, lower alkyl radicals and phenyl radicals.

7. 6-Hal-5-cyano-3,4-di-lower alkyl-pyridazines wherein Hal represents a halogen atom having an atomic weight of more than 20.

8. 6-chloro-5-carbethoxy-3,4-diphenyl-pyridazine.

9. 6-chloro-5-carbethoxy-3,4-di-(para - chlorophenyl)-pyridazine.

References Cited in the file of this patent

Homer et al.: Jour. Chem. Soc., 1948, pp. 2195–9.